United States Patent
Yoshino

(10) Patent No.: US 8,692,910 B2
(45) Date of Patent: Apr. 8, 2014

(54) IMAGE PROCESSING DEVICE, IMAGE SIGNAL CORRECTION METHOD, CORRECTION MATRIX CALCULATION METHOD, AND IMAGING DEVICE

(75) Inventor: Koichiro Yoshino, Tokyo (JP)

(73) Assignee: Olympus Corporation, Tokyo (JP)

(*) Notice: Subject to any disclaimer, the term of this patent is extended or adjusted under 35 U.S.C. 154(b) by 144 days.

(21) Appl. No.: 12/835,953

(22) Filed: Jul. 14, 2010

(65) Prior Publication Data

US 2010/0277626 A1    Nov. 4, 2010

Related U.S. Application Data

(63) Continuation of application No. PCT/JP2009/050809, filed on Jan. 21, 2009.

(30) Foreign Application Priority Data

Jan. 23, 2008  (JP) ................................. 2008-012983

(51) Int. Cl.
*H04N 9/64* (2006.01)
(52) U.S. Cl.
USPC ........................................................ 348/246
(58) Field of Classification Search
USPC ........................................................ 348/246
See application file for complete search history.

(56) References Cited

U.S. PATENT DOCUMENTS

| | | | |
|---|---|---|---|
| 6,034,724 A | 3/2000 | Nakamaura | |
| 2002/0025069 A1 | 2/2002 | Endo et al. | |
| 2002/0044778 A1 | 4/2002 | Suzuki | |
| 2006/0092485 A1* | 5/2006 | Tamaru | 358/518 |
| 2006/0132628 A1 | 6/2006 | Suzuki | |
| 2007/0040916 A1 | 2/2007 | Ashida et al. | |
| 2007/0195181 A1 | 8/2007 | Onomura | |
| 2011/0216230 A1 | 9/2011 | Suzuki | |

FOREIGN PATENT DOCUMENTS

| | | | |
|---|---|---|---|
| JP | 6-292224 A | 10/1994 | |
| JP | 9-200781 A | 7/1997 | |
| JP | 9-219866 A | 8/1997 | |
| JP | 2001-320722 A | 11/2001 | |
| JP | 2002-084547 A | 3/2002 | |

(Continued)

OTHER PUBLICATIONS

International Search Report and Written Opinion dated Apr. 28, 2009 (in English translation) in counterpart International Application No. PCT/JP2009/050809.

(Continued)

*Primary Examiner* — Usman Khan
(74) *Attorney, Agent, or Firm* — Holtz, Holtz Goodman & Chick PC

(57) ABSTRACT

Provided is an imaging device that is equipped with an image acquisition element having color filters in prescribed arrays; a judgment unit that judges to which group individual pixels of a color image belong, the group being a group among a plurality of groups determined in accordance with the arrangement of color filters, and the color image being an image generated based on output signals from the image acquisition element; a storage unit in which the groups are stored in association with correction matrices; and a correction unit that obtains the correction matrices corresponding to groups to which each of the pixels belongs from the storage unit and that corrects the image signal values of individual pixels by using the obtained correction matrices.

8 Claims, 7 Drawing Sheets

(56) References Cited

FOREIGN PATENT DOCUMENTS

| JP | 2005-278004 A | 10/2005 |
| JP | 3755921 B2 | 1/2006 |
| JP | 2007-053479 A | 3/2007 |
| JP | 2007-228155 A | 9/2007 |

OTHER PUBLICATIONS

Japanese Office Action dated Oct. 16, 2012 issued in counterpart Japanese Application No. 2008-012983.

* cited by examiner

|  | m=1 | m=2 | m=3 | ··· |
|---|---|---|---|---|
| n=1 | Mg1 | Gr1 | Mg1 | Gr1 |
| n=2 | Cy1 | Ye1 | Cy1 | Ye1 |
| n=3 | Gr2 | Mg2 | Gr2 | Mg2 |
| ⋮ | Cy2 | Ye2 | Cy2 | Ye2 |
| 1 | Mg1 | Gr1 | Mg1 | Gr1 |
|  | Cy1 | Ye1 | Cy1 | Ye1 |

FIG. 3

|  | m=1 | m=2 | m=3 | ··· |
|---|---|---|---|---|
| n=1 | Y1 | Y1 | Y1 | Y1 |
| n=2 | Y2 | Y2 | Y2 | Y2 |
| n=3 | Y3 | Y3 | Y3 | Y3 |
| ⋮ | Y4 | Y4 | Y4 | Y4 |
| ⋮ | Y1 | Y1 | Y1 | Y1 |
| ⋮ | Y2 | Y2 | Y2 | Y2 |

FIG. 4

|  | m=1 | m=2 | m=3 | ··· |
|---|---|---|---|---|
| n=1 | Cb α | Cb α | Cb α | Cb α |
| n=2 | Cr α | Cr α | Cr α | Cr α |
| n=3 | Cr β | Cr β | Cr β | Cr β |
| ⋮ | Cb β | Cb β | Cb β | Cb β |
| ⋮ | Cb α | Cb α | Cb α | Cb α |
| ⋮ | Cr α | Cr α | Cr α | Cr α |

|  | m=1 | m=2 | m=3 | ··· |
|---|---|---|---|---|
| n=1 | Y1<br>Cb1<br>Cr1 | Y1<br>Cb1<br>Cr1 | Y1<br>Cb1<br>Cr1 | Y1<br>Cb1<br>Cr1 |
| n=2 | Y2<br>Cb2<br>Cr2 | Y2<br>Cb2<br>Cr2 | Y2<br>Cb2<br>Cr2 | Y2<br>Cb2<br>Cr2 |
| n=3 | Y3<br>Cb3<br>Cr3 | Y3<br>Cb3<br>Cr3 | Y3<br>Cb3<br>Cr3 | Y3<br>Cb3<br>Cr3 |
| ⋮ | Y4<br>Cb4<br>Cr4 | Y4<br>Cb4<br>Cr4 | Y4<br>Cb4<br>Cr4 | Y4<br>Cb4<br>Cr4 |
|  | Y1<br>Cb1<br>Cr1 | Y1<br>Cb1<br>Cr1 | Y1<br>Cb1<br>Cr1 | Y1<br>Cb1<br>Cr1 |
|  | Y2<br>Cb2<br>Cr2 | Y2<br>Cb2<br>Cr2 | Y2<br>Cb2<br>Cr2 | Y2<br>Cb2<br>Cr2 |

FIG. 10

|  | m=1 | m=2 | m=3 | ··· |
|---|---|---|---|---|
| n=1 | R | Gr | R | Gr |
| n=2 | Gb | B | Gb | B |
| n=3 | R | Gr | R | Gr |
| ⋮ | Gb | B | Gb | B |

FIG. 11

|  | m=1 | m=2 | m=3 | ··· |
|---|---|---|---|---|
| n=1 | R Ga B | R Gr B | R Ga B | R Gr B |
| n=2 | R Gb B | R Ga B | R Gb B | R Ga B |
| n=3 | R Ga B | R Gr B | R Ga B | R Gr B |
| ⋮ | R Gb B | R Ga B | R Gb B | R Ga B |

IMAGE PROCESSING DEVICE, IMAGE SIGNAL CORRECTION METHOD, CORRECTION MATRIX CALCULATION METHOD, AND IMAGING DEVICE

CROSS REFERENCE TO RELATED APPLICATIONS

This is a continuation of International Application PCT/JP2009/050809, with an international filing date of Jan. 21, 2009, which is hereby incorporated by reference herein in its entirety. This application claims the benefit of Japanese Patent Application No. 2008-012983, the content of which is incorporated herein by reference.

FIELD OF THE INVENTION

The present invention relates to an image signal correction method that corrects a color image signal, a correction matrix calculation method that is used when correcting a color image signal, and an image processing device and an imaging device that employ the image signal correction method.

DESCRIPTION OF RELATED ART

Many imaging systems of current digital cameras, video cameras, etc., employ an image acquisition element having complementary-color-based or primary-color-based color filters disposed in the front surface thereof. With the recent size reduction in the pixel size of imaging devices, a phenomenon in which light passing through a color filter for a pixel adjacent to a pixel of interest intrudes on the pixel of interest, thereby shifting the spectral characteristics of the pixel of interest from what was intended, is referred to as "color-mixing" hereinafter.

The influence of the color-mixing on the spectral characteristics differs depending on the type of adjacent color filter. Because of this, when arrangements of color filters differ depending on the position on an imaging surface, image signals, which are created by mixing image signals from individual pixels or outputs from individual pixels and which should originally have the same spectral characteristics, end up having different spectral characteristics depending on the position in the image.

As a result, even when a uniform subject is imaged, its output image does not become uniform; instead, differences in spectral characteristics eventually appear as brightness/color noise.

In addition, the changes in spectral characteristics due to color-mixing are also greatly influenced by variations in the width, thickness, etc. of individual color filters due to manufacturing conditions.

As a method for correcting such differences in the spectral characteristics of image signals depending on the position in an image, for example, the Publication of Japanese Patent No. 3755921 discloses a method in which an image of a subject is captured assuming a reference image capturing environment, and correction is performed by multiplying the image signals by correction coefficients so that output signals for the subject become uniform.

BRIEF SUMMARY OF THE INVENTION

In the above-described conventional correction method, by assuming a reference subject, correction is performed by multiplying only the types of signal values to be corrected by correction coefficients; therefore, highly precise correction is possible for the reference subject (subject with one type of spectral characteristic) which is used to calculate the correction coefficients.

A first aspect of the present invention is an image processing device that includes a judgment unit that judges to which group individual pixels of a color image belong, the group being a group among a plurality of groups determined in accordance with the arrangement of color filters, and the color image being an image generated based on output signals from an image acquisition element having the color filters in prescribed arrays; a storage unit in which the groups are stored in association with correction matrices; and a correction unit that obtains the correction matrices corresponding to the groups to which each of the pixels belongs from the storage unit and that corrects types of image signals targeted for correction by using the correction matrices obtained and all types of image signals in the individual pixels.

A second aspect of the present invention is an image signal correction method that includes judging to which group individual pixels of a color image belong, the group being a group among a plurality of groups determined in accordance with the arrangement of color filters, and the color image being an image generated based on output signals from an image acquisition element having the color filters in prescribed arrays; obtaining correction matrices corresponding to the groups to which each of the pixels belongs from a storage unit where the groups and correction matrices are stored in association with each other; and correcting types of image signals targeted for correction by using the correction matrices obtained and all types of image signals in the individual pixels.

A third aspect of the present invention is a correction matrix calculation method used when correcting a color image generated based on output signals from an image acquisition element having color filters in prescribed arrays, the correction matrix calculation method including obtaining color images by capturing images of a plurality of color charts having different spectral characteristics by using the image acquisition element; and calculating the correction matrices, when individual pixels of the color images are divided into a plurality of groups determined in accordance with the arrangement of the color filters, such that at least one type of image signal values, of multiple types of image signal values, with respect to each color chart substantially match between at least two groups.

A fourth aspect of the present invention is an imaging device that includes an image acquisition element having color filters in prescribed arrays; a judgment unit that judges to which group individual pixels of a color image belong, the group being a group among a plurality of groups determined in accordance with the arrangement of the color filters, and the color image being an image generated based on output signals from the image acquisition element; a storage unit in which the groups are stored in association with correction matrices; and a correction unit that obtains correction matrices corresponding to groups to which each of the pixels belongs from the storage unit and that corrects types of image signals targeted for correction by using the correction matrices obtained and all types of image signals in the individual pixels.

BRIEF DESCRIPTION OF THE SEVERAL VIEWS OF THE DRAWINGS

FIG. 3 is a diagram showing an example of brightness signals of individual pixels of a captured image.

FIG. 4 is a diagram showing an example of color-difference signals of individual pixels of a captured image.

FIG. 10 is a diagram showing an example of primary color filters according to a second embodiment of the present invention.

FIG. 11 is a diagram showing an example of image signals to be assigned to individual pixels of a captured image when the synchronization processing is performed on image signals generated using the primary color filters shown in FIG. 10.

DETAILED DESCRIPTION OF THE INVENTION

Each of embodiments of an image processing device, an image signal correction method, a correction matrix calculation method, and an imaging device according to the present invention will be described below, with reference to the drawings.

First Embodiment

In this embodiment, descriptions of an imaging device, an image signal correction method, and a correction matrix calculation method will be given for a case in which color difference line-sequential complementary color filters (hereinafter, referred to as "complementary color filters") are used as color filters provided in an image acquisition element.

Figures 1, 2:
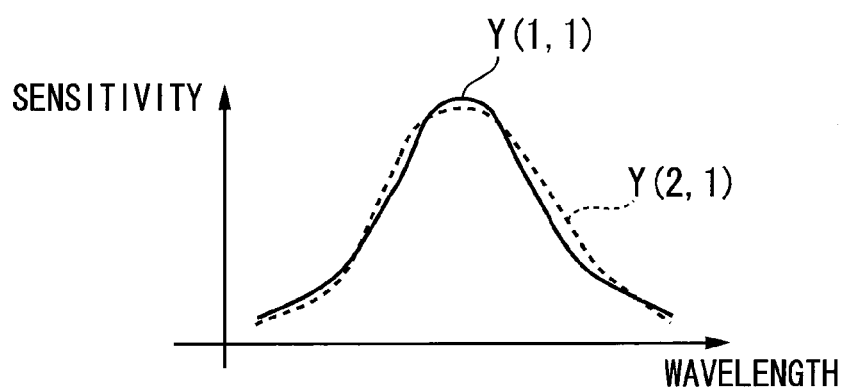
FIG. 1 is a diagram showing an example of complementary color filters according to a first embodiment of the present invention.
FIG. 2 is a diagram comprising and showing an example of spectral characteristics of brightness signals of two pixels.

FIG. 1 is a diagram showing an example of the complementary color filters that are two-dimensionally arrayed on the front surface of an image acquisition element, such as a color CCD, etc. As shown in FIG. 1, the complementary color filters are configured by arranging basic arrays 1 repeated in horizontal and vertical directions, in which color filters of four colors (magenta (Mg), green (Gr), cyan (Cy), and yellow (Ye)) are regularly arranged.

In FIG. 1, each color filter is given a suffix "1" or "2" depending on differences in adjacent color filter arrays. Filters having different suffixes indicate that they have different spectral characteristics due to the influence of color-mixing.

Brightness Signal

The influence of the complementary filters shown in FIG. 1 on brightness signals of individual pixels of a captured image are considered first.

The brightness signals of the individual pixels are created based on the following Expression (1) using output signals from 2×2 color filters that constitute the complementary color filters.

$Y(n, m)$, for example, represents a brightness signal of a pixel (pixel of interest) in n-th row and m-th column, and CF (n, m) represents an output signal of a color filter in the n-th row and m-th column in the captured image.

$$Y(n,m)=[CF(n,m)+CF(n+1,m)]+[CF(n,m+1)+CF(n+1,m+1)] \quad (1)$$

Here, filters of the same color have the same spectral characteristics, and in a case without the influence of the color-mixing, in other words, in a case where the following Expression (2) holds, the following Expression (3) always holds.

[Eq. 1]

$$\left.\begin{array}{l} Mg1 = Mg2 = Mg \\ Cy1 = Cy2 = Cy \\ Gr1 = Gr2 = Gr \\ Ye1 = Ye2 = Ye \end{array}\right\} \quad (2)$$

$$Y = Mg + Cy + Gr + Ye \quad (3)$$

As expressed in the above-described Expression (3), when individual filters of the same colors have the same spectral characteristics, brightness signals of the individual pixels will always have the same spectral characteristics regardless of the position in the captured image. However, as the suffixes indicate in FIG. 1, when the spectral characteristics of the individual color filters are influenced by color-mixing, the spectral characteristics of brightness signals of individual pixels will change in accordance with the positions of those pixels in the captured image.

In the captured image, a brightness signal Y (n, m) of a pixel (n, m) is expressed by the following Expression (4).

$$Y(n,m)=[CF(n,m)+CF(n+1,m)]+[CF(n,m+1)+CF(n+1,m+1)] \quad (4)$$

For example, the brightness signals Y of individual pixels (1, 1), (2, 1), (3, 1), and (4, 1) disposed in the first column of the captured image are as follows.

$$Y(1, 1) = [CF(1, 1) + CF(2, 1)] + \\ [CF(1, 2) + CF(2, 2)] \\ = [Mg1 + Cy1] + [Gr1 + Ye1]$$

$$Y(2, 1) = [CF(2, 1) + CF(3, 1)] + \\ [CF(2, 2) + CF(3, 2)] \\ = [Cy1 + Gr2] + [Ye1 + Mg2]$$

$$Y(3, 1) = [CF(3, 1) + CF(4, 1)] + \\ [CF(3, 2) + CF(4, 2)] \\ = [Gr2 + Cy2] + [Mg2 + Ye2]$$

$$Y(4, 1) = [CF(4, 1) + CF(5, 1)] + \\ [CF(4, 2) + CF(5, 2)] \\ = [Cy2 + Mg1] + [Ye2 + Gr1]$$

Here, FIG. 2 shows examples of spectral characteristics of the brightness signals Y (1, 1) and Y (2, 1) for the pixels (1, 1) and (2, 2). As shown in FIG. 2, it is clear that the spectral characteristics of brightness signals change in accordance with the positions in the captured image.

In addition, the brightness signal of the pixel (5, 1) in the first row and fifth column is expressed by the following Expression (5).

$$Y(5, 1) = [CF(5, 1) + CF(6, 1)] + \qquad (5)$$
$$[CF(5, 2) + CF(6, 2)]$$
$$= [Mg1 + Cy1] + [Gr1 + Ye1]$$

As is clear from the above-described Expression (5), spectral characteristics of the brightness signal of the pixel (5, 1) becomes similar to Y (1, 1); also in the subsequent 6th column and thereafter, the spectral characteristics of the brightness signals that have appeared for the above-described first to fourth columns will regularly appear. Defining brightness signal Y (1, 1) of pixel (1, 1) as Y1, brightness signal Y (2, 1) of pixel (2, 1) as Y2, brightness signal Y (3, 1) of pixel (3, 1) as Y3, and brightness signal Y (4, 1) of pixel (4, 1) as Y4, the brightness signals of individual pixels in the captured image are as shown in FIG. 3.

That is, as shown in FIG. 3, in the captured image, four types of brightness signals with different spectral characteristics repeatedly appear in the vertical direction (individual rows), and brightness signals having the same spectral characteristics will appear in the horizontal direction (individual columns); therefore, horizontal stripe-like brightness noise occurs in the image as a whole.

Color Difference Signal

Next, a color difference signal will be described.

A color difference signal corresponding to a brightness signal Y (n, m) is expressed by one of Cb (n, m) and Cr (n, m) in the following expressions in accordance with the arrangements of the filters.

More specifically, when combinations of adjacent pixels in the vertical direction (individual rows) in the 2×2 pixels creating the above-described brightness signal Y are Mg & Cy and Gr & Ye, the color difference signal is expressed by Expression (6) below.

$$Cb=[Mg+Cy]-[Gr+Ye] \qquad (6)$$

For example, since the 2×2 pixels creating Y (1, 1) are combinations of Mg1 & Cy1 and Gr1 & Ye1, the color difference signal C (1, 1) corresponding to Y (1, 1) is as follows.

$$C(1,1)=[Mg1+Cy1]-[Gr1+Ye1]$$

In addition, when combinations of adjacent pixels in the vertical direction (individual rows) in the 2×2 pixels creating the brightness signal Y are Mg & Ye and Gr & Cy, the color difference signal is expressed by Expression (7) below.

$$Cr=[Mg+Ye]-[Gr+Cy] \qquad (7)$$

For example, since the 2×2 pixels creating Y (2, 2) are combinations of Mg2 & Ye1 and Gr2 & Cr1, the color difference signal C (2, 2) corresponding to Y (2, 2) is as follows.

$$C(2,2)=[Mg2+Ye1]-[Gr2+Cy1]$$

Looked at in this way, as shown in FIG. 1, in individual rows in the horizontal direction, combinations of filters creating the color difference signals are always constant; therefore, for the color difference signals C, similarly to the brightness signals Y, the spectral characteristics in the horizontal direction will be constant regardless of the influence of color-mixing.

Furthermore, defining $Cb\alpha$ as $[Mg1+Cy1]-[Gr1+Ye1]$;

$Cb\beta$ as $[Mg1+Cy2]-[Gr1+Ye2]$;

$Cr\alpha$ as $[Mg2+Ye1]-[Gr2+Cy1]$; and $Cr\beta$ as $[Mg2+Ye2]-[Gr2+Cy2]$, in the captured image as a whole, as shown in FIG. 4, it is clear that the above-described four types of color difference signals $Cb\alpha$, $Cb\beta$, $Cr\alpha$, and $Cr\beta$ will appear repeatedly in individual rows.

Figures 5, 6:
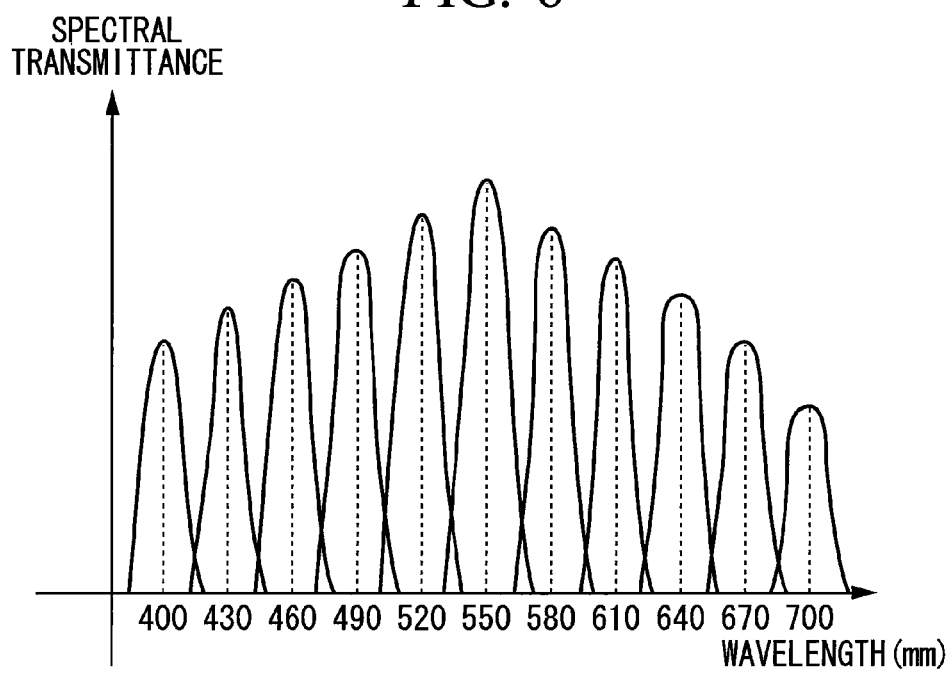
FIG. 5 is a diagram showing an example of image signals to be assigned to individual pixels of a captured image after synchronization processing.
FIG. 6 is a diagram showing an example of narrow-band spectral characteristics possessed by a color chart.

Normally, in an imaging device, after creating the above-described brightness signals Y and the color difference signals C, prescribed synchronization processing is applied to the color signals, and, as shown in FIG. 5, three image signals, Y, Cb, and Cr are assigned to all pixels in the captured image. In FIG. 5, suffixes 1 to 4 placed after Cb and Cr indicate the brightness signals corresponding to the individual color difference signals.

As is clear from FIG. 5, when the complementary color filters shown in FIG. 1 are used, a captured image having uniform spectral characteristics in the horizontal direction (individual rows) is obtained. In the vertical direction (individual columns), on the other hand, pixels having four types of spectral characteristics repeatedly appear. Therefore, when the complementary color filters shown in FIG. 1 are used, horizontal stripe-like color noise occurs due to such variations in the spectral characteristics of the brightness signals and color difference signals, as shown in FIG. 5.

As described above, the brightness/color noise, which is considered a problem in this embodiment, is caused by the spectral characteristics that vary in accordance with position in the captured image. Therefore, in the image signal correction method according to this embodiment, a whole image is divided into four groups where a collection of horizontal lines whose spectral characteristics of brightness/color difference signals are equal is defined as one group, and the brightness/color noise is reduced by correcting individual signals in each group.

More specifically, by defining one of the four divided groups as a reference group (first group) and each of the remaining three groups as a target group (second group), a correction matrix that makes signal values (Y, Cb, and Cr) of the target group substantially match signal values (Y, Cb, and Cr) of the reference group is created for each target group. Then, by correcting the respective signal values of individual target groups by using these correction matrices, signals of individual groups are made to substantially match each other. Accordingly, it is possible to simultaneously correct the brightness noise and color noise in the entire captured image.

Expression (8) shows an example of a correction formula using the correction matrix.

[Eq. 2]

$$\begin{pmatrix} Y^c \\ Cb^c \\ Cr^c \end{pmatrix} = \begin{pmatrix} a_1 & a_2 & a_3 \\ a_4 & a_5 & a_6 \\ a_7 & a_8 & a_9 \end{pmatrix} \begin{pmatrix} Y \\ Cb \\ Cr \end{pmatrix} \qquad (8)$$

In the above-described Expression (8), Y, Cb, and Cr are signal values before correction and $Y^c$, $Cb^c$, $Cr^c$ are signal values after correction.

Next, a calculation method of the correction matrix used in the above-described Expression (8) will be described.

Figure 7:
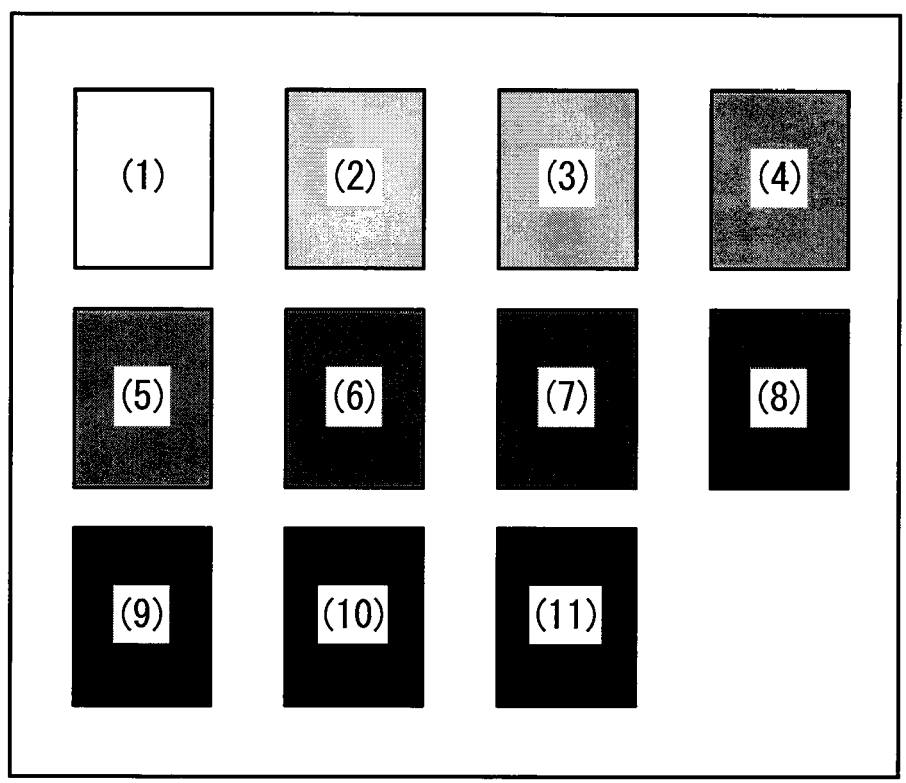
FIG. 7 is a diagram showing an example of a color chart.

For example, when a subject targeted for image capturing cannot be restricted, by capturing images of a plurality of color charts (see FIG. 7) having narrow-band spectral characteristics, as shown in FIG. 6, and by using signal values that correspond to the individual color charts output from the reference group and target groups in these captured images, a correction matrix is calculated with the least squares method, as shown in Expression (9) below.

[Eq. 3]

$$\min \sum_{i=1}^{n} |Y_i^T - (a_1 \cdot Y_i^O + a_2 \cdot Cb_i^O + a_3 \cdot Cr_i^O)|^2 \qquad (9)$$

$$\min \sum_{i=1}^{n} |Cb_i^T - (a_4 \cdot Y_i^O + a_5 \cdot Cb_i^O + a_6 \cdot Cr_i^O)|^2$$

$$\min \sum_{i=1}^{n} |Cr_i^T - (a_7 \cdot Y_i^O + a_8 \cdot Cb_i^O + a_9 \cdot Cr_i^O)|^2$$

In the above-described Expression (9), $Y_i^T$, $Cb_i^T$, and $Cr_i^T$ represent signal values output from the reference group, and $Y_i^O$, $Cb_i^O$, and $Cr_i^O$ represent signal values output from the target groups. In addition, n represents the number of color charts.

Here, if each color chart has a sufficiently small bandwidth of spectral characteristics and, additionally, if the number of color charts used adequately encompasses a spectral sensitivity range of the image acquisition element in question, these correction coefficients make the spectral characteristics of individual signals of the target group close to the spectral characteristics of the reference group; therefore, it is possible to correct the brightness noise and color noise independently of the subject.

In this way, the correction matrices define the relationship between at least one type of image signal values in the reference group, i.e., one of the brightness signal Y and the color difference signals Cb and Cr, and all types of image signal values in the target groups, i.e. the brightness signal Y and the color difference signal Cb and Cr.

In addition, the above-described correction matrices become correction matrices that make at least one type of image signal values, of multiple types (brightness signal and color difference signal), for each color chart substantially match between at least two groups. Also, if image signals of target groups of a color image are corrected with these correction matrices, such correction matrices can substantially match between average spectral characteristics of pixels belonging to the reference group and average spectral characteristics of pixels belonging to the target groups.

On the other hand, when subjects targeted for image capturing can be restricted to some extent, correction matrices can be calculated by capturing only the required number of images to guarantee the performance of color charts in accordance with expected subjects, and by performing a similar calculation.

In the above-described example calculation, the correction matrix was calculated as a linear 3×3 matrix; however, it is also possible to apply non-linear matrix coefficients calculated with the least squares method, including high-order terms which are mutual products of $Y_i^O$, $Cb_i^O$, and $Cr_i^O$. The calculation of the non-linear matrix coefficients is, for example, performed as follows.

[Eq. 4]

$$\min \sum_{i=1}^{n} \left| Y_i^T - \begin{pmatrix} b_{11} \cdot Y_i^O + b_{12} \cdot Cb_i^O + b_{13} \cdot Cr_i^O + b_{14} \cdot Y_i^O \cdot \\ Cb_i^O + b_{15} \cdot Cb_i^O \cdot Cr_i^O + b_{16} \cdot Cr_i^O \cdot Y_i^O \end{pmatrix} \right|^2 \qquad (10)$$

$$\min \sum_{i=1}^{n} \left| Cb_i^T - \begin{pmatrix} b_{21} \cdot Y_i^O + b_{22} \cdot Cb_i^O + b_{23} \cdot \\ Cr_i^O + b_{24} \cdot Y_i^O Cb_i^O + b_{25} \cdot Cb_i^O \cdot \\ Cr_i^O + b_{26} \cdot Cr_i^O \cdot Y_i^O \end{pmatrix} \right|^2$$

$$\min \sum_{i=1}^{n} \left| Cr_i^T - \begin{pmatrix} b_{31} \cdot Y_i^O + b_{32} \cdot Cb_i^O + b_{33} \cdot \\ Cr_i^O + b_{34} \cdot Y_i^O \cdot Cb_i^O + b_{35} \cdot Cb_i^O \cdot \\ Cr_i^O + b_{36} \cdot Cr_i^O \cdot Y_i^O \end{pmatrix} \right|^2$$

Here, $b_{11}$ to $b_{36}$ are coefficients of a 3×6 non-linear matrix. $b_{11}$ to $b_{36}$ are calculated for when each of the three formulas of Expression (10) is minimized. Furthermore, although coefficients of the 3×6 non-linear matrix are calculated in the above-described Expression (10), it is also possible to apply coefficients of a 3×9 non-linear matrix including higher order terms.

For the sake of convenience, the above-described explanation assumed the case of performing synchronization processing of color difference signals such that the occurrence patterns of the brightness noise and color noise become the same. However, when the occurrence patterns of the brightness noise and color noise are different, correction by a similar method is also possible by performing group division where a collection of pixels with common spectral characteristics of brightness signals and color difference signals is defined as one group.

In addition, in the above-described explanation, the explanation assumed the case in which all color filters constituting the complementary color filters are influenced by the color-mixing, changing the spectral characteristics. However, in reality, there are cases in which some of the color filters are influenced by the color-mixing, and therefore, it is conceivable that the type of color filters influenced by color-mixing will change depending on CCD units, and the occurrence patterns, such as the noise period, etc. will change.

In such a case also, by performing grouping assuming that all color filters whose adjacent filter arrays are different are influenced by the color-mixing, division into finer groups is avoided; therefore, correction will not be interfered with. In addition, although variation in the spectral characteristics may occur only in the brightness signals, depending on the type of color filters influenced by the color-mixing, it is needless to say that correction by a similar method is possible.

Furthermore, when the arrangement of individual color filters or the method of creating the brightness/color difference signals changes, it is conceivable that the occurrence patterns of the brightness/color noise due to the influence of color-mixing will change, and individual groups may not necessarily be collections of horizontal lines. In such a case also, it is possible to perform correction with a similar method by grouping in advance in accordance with the spectral characteristics of individual pixels based on the arrangement of filters and calculation formulas of individual signals.

Next, an imaging device and an image processing device employing the image signal processing method described above will be described with reference to the drawings.

Figure 8:
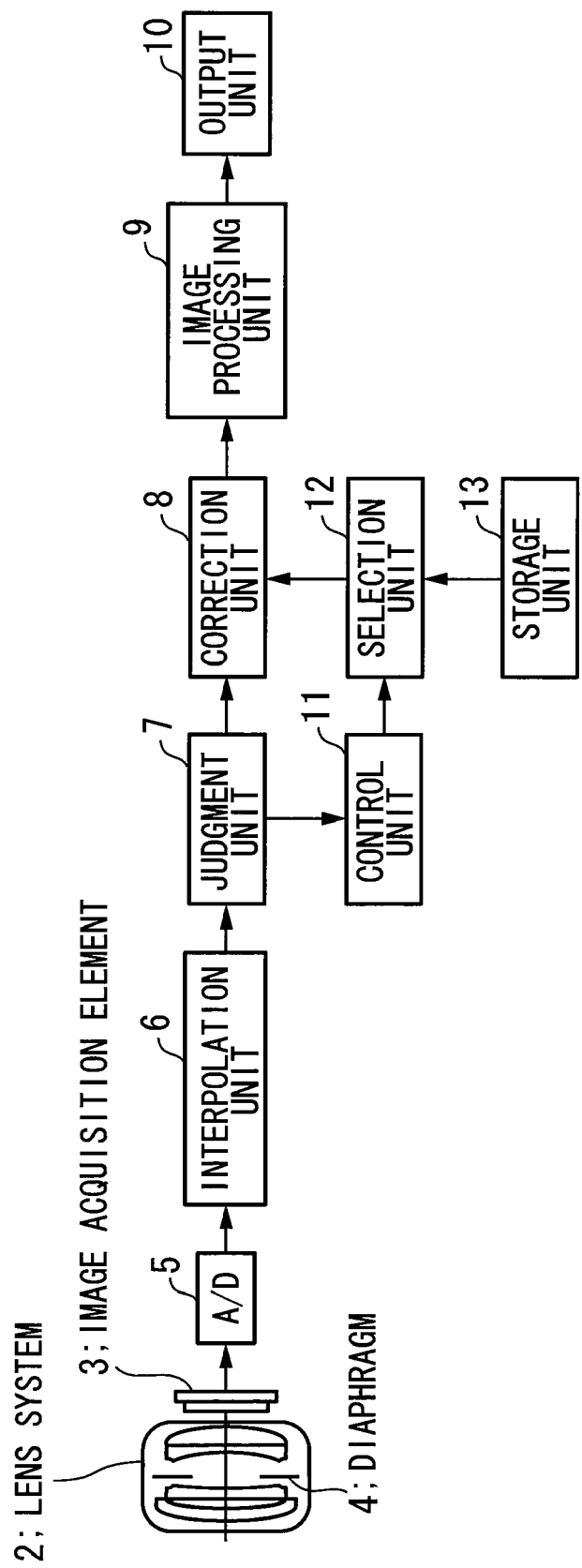
FIG. 8 is a diagram showing the configuration of an imaging device according to the first embodiment of the present invention.

FIG. 8 is a block diagram showing, in outline, the configuration of an imaging device and an image processing device according to the first embodiment of the present invention. In the imaging device shown in FIG. 8, a subject image formed by a lens system 2 is imaged on an imaging plane of an image acquisition element 3 and is converted to electric signals after passing through the individual color filters.

In this embodiment, the image acquisition element 3 is assumed to be a single-chip CCD having the color difference line-sequential complementary color filters shown in FIG. 1. Therefore, image signals output from the image acquisition element 3 are YCbCr signals.

The image signals obtained in this way are converted to digital signals in an A/D conversion unit 5. Thereafter, the YCbCr signals are generated for individual pixels in the image in a correction unit 6 by known synchronization processing and are output to a judgment unit 7. The judgment unit 7 judges to which group of a plurality of groups determined in accordance with arrangement of the color filters each pixel of an input image belongs.

For example, the judgment unit 7 holds information in which the positions of individual pixels in a captured image are associated with groups and performs grouping of the individual pixels based on this information. The individual signals of grouped pixels are output to a correction unit 8. Note that, components other than the lens system 2, the image acquisition element 3, and the A/D conversion unit 5 perform the functions of the image processing device.

On the other hand, a storage unit 13 stores a plurality of correction matrices in association with groups. A control unit 11 supplies a selection unit 12 with information about groups to which individual pixels input to the correction unit 8 belong.

Accordingly, the selection unit 12 reads out the correction matrices corresponding to the groups to which the pixels belong from a plurality of correction matrices stored in the storage unit 13 and outputs the read-out correction matrices to the correction unit 8. The correction unit 8 corrects signal values (brightness signals and color difference signals) of the pixels output from the judgment unit 7 using the correction matrices given by the selection unit 12.

More specifically, the correction unit 8 corrects the type of pixel values being targeted for correction using the correction matrices and all types of signal values in the pixels. All types of signal values constituting individual pixels can be targeted for correction. That is, in this embodiment, although the brightness signals and color difference signals are corrected separately, in the case of correcting the brightness signals and in the case of correcting the color difference signals, all types of signal values (in this case, the brightness signals and color difference signals) constituting the pixels are used to perform correction.

Corrected signal values of individual pixels are output to the image processing unit 9, are output to the output unit 10 after prescribed image processing is performed, and are then output as a single image.

As described above, with the imaging device, the image signal correction method, and the correction matrix calculation method according to this embodiment, individual pixels are divided into a plurality of groups determined in accordance with the arrangement of correction filters, and correction of the signal values of individual pixels is performed by using different correction matrices for each group.

In this case, since the correction matrices for each group are calculated such that signal values of all groups become substantially equal, it becomes possible to make signal values corrected using the correction matrices uniform. Accordingly, over the entire image, variations in the spectral characteristics can be eliminated, and the noise caused by color-mixing can be eliminated.

Although this embodiment assumed processing by hardware, such configuration need not be limited thereto. For example, a configuration in which image signals from the image acquisition element 3 are input to a personal computer as unprocessed RAW data and separately processed with software is also possible.

In this case, a program for realizing the image signal correction method according to this embodiment is recorded in a computer-readable recording medium, and the following image signal correction method is realized by a CPU that executes the program recorded in this recording medium.

Figure 9:
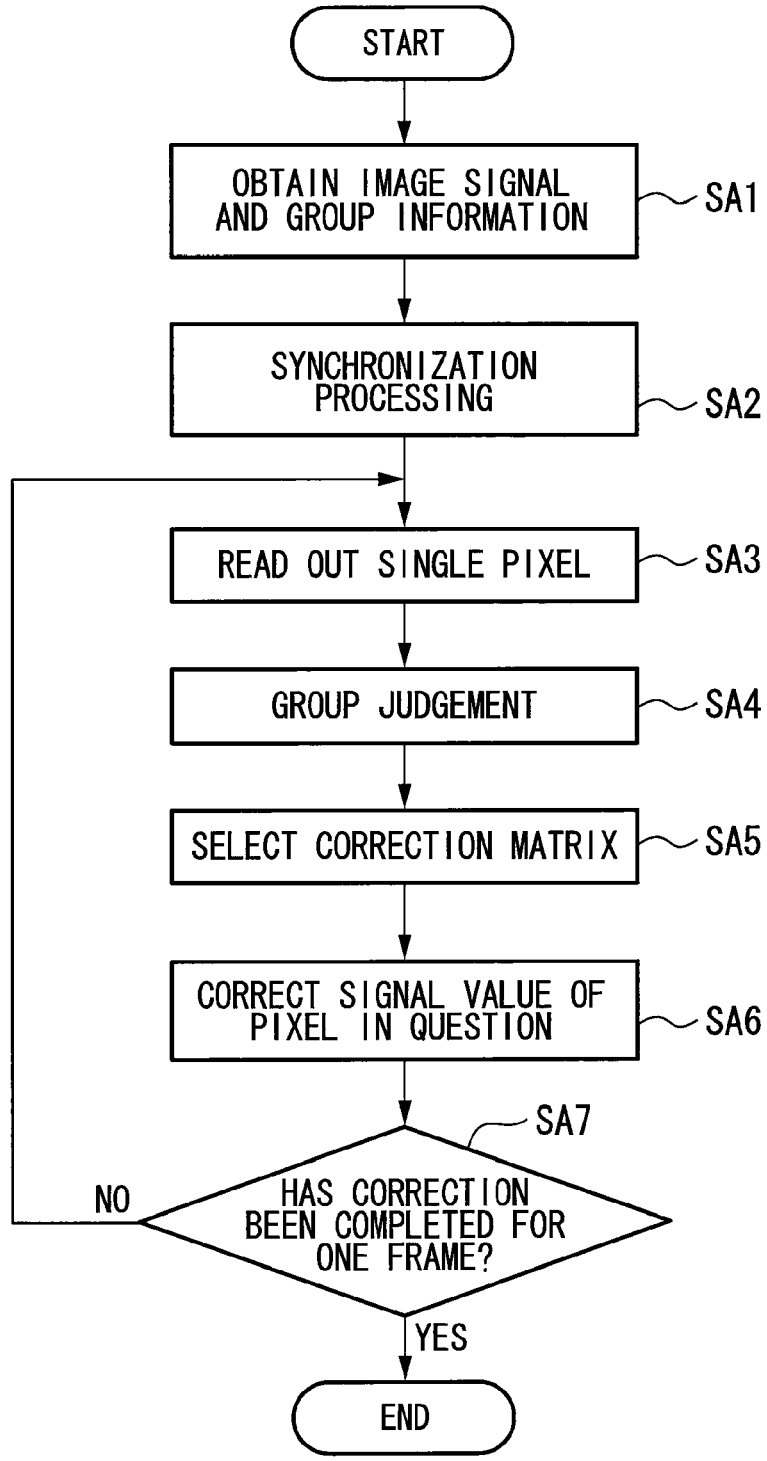
FIG. 9 is a flow chart showing a procedure of an image signal correction method according to the first embodiment of the present invention.

FIG. 9 is a diagram showing a flow chart showing a procedure of the image signal correction method according to the first embodiment of the present invention.

In FIG. 9, unprocessed color image signals and information regarding a plurality of predetermined groups are input in Step SA1. In Step SA2, the synchronization processing is performed on the color image signals obtained in Step SA1, and brightness signals Y and color difference signals Cb and Cr are generated for all pixels of the color image.

In Step SA3, a signal value for one pixel is read out from one frame of image signals generated in Step SA2, and, in Step SA4, it is determined to which group of the plurality of groups obtained in Step SA1 this pixel belongs.

In Step SA5, a correction matrix corresponding to the group to which this pixel belongs is selected from a plurality of matrices stored in advance. In Step SA6, the signal values of the pixel are corrected using the selected correction matrix. In Step SA7, it is determined whether correction has been completed for all pixels of one frame.

As a result of this, if the above-described signal correction has not been completed for one frame of pixels ("NO" in Step SA7), returning to Step SA3, a signal value of a new pixel are read out, and the above-described correction processing is performed on the signal value of this pixel. On the other hand, if the signal correction for one frame of pixels has been completed ("YES" in Step SA7), the processing ends.

Second Embodiment

Next, a second embodiment of the present invention will be described using FIGS. 10 and 11.

In this embodiment, an imaging device that employs an image acquisition element having primary color filters will be described.

FIG. 10 is an example of primary color filters that are two-dimensionally arrayed on a color CCD. Primary colors, red (R), green (G), and blue (B) are arranged in a Bayer array. Green filters are represented by Gr or Gb depending on differences in adjacent color filters in the horizontal direction, indicating that these two have different spectral characteristics due to the influence of color-mixing.

Here, a case in which all pixels have R, G, and B information due to the synchronization processing is considered. Since there is no difference in spectral characteristics between the R signal and the B signal due to their positions, the synchronization processing causes all pixels to have R signals and B signals with the same spectral characteristics.

Next, the G signal is considered. For example, assuming that the synchronization processing is performed for the G signal of a pixel having R and B color filters using an average value of four pixels that are adjacent to this pixel at the top, bottom, left, and right, the G signal of a pixel having R and B color filters is always expressed as (Gr+Gb)/2.

Defining this as Ga, as shown in FIG. 11, lines repeating Ga and Gr or Ga and Gb will alternately appear in the G signal after the synchronization processing. In such a case, it is not possible to express a group as a collection of single lines as in the above-described first embodiment. Therefore, what is considered in this embodiment is reduction of noise caused by the color-mixing in which a group is defined as a collection of pixels whose spectral characteristics of R, G, and B signals are equal, the whole image is divided into three groups, and individual signals are corrected for each group.

In this case also, one of the three divided groups is set as a reference group, the remaining two groups are set as target groups, and correction matrices are created for each target group such that signal values of the target groups substantially match signal values of the reference group. Then, signals of individual groups are substantially matched by individually correcting signal values of target groups using these correction matrices.

Accordingly, the brightness noise and color noise of the entire captured image can be simultaneously eliminated. Expression (11) shows an example of a correction formula using the correction matrix.

[Eq. 5]

$$\begin{pmatrix} R^c \\ G^c \\ B^c \end{pmatrix} = \begin{pmatrix} a_1 & a_2 & a_3 \\ a_4 & a_5 & a_6 \\ a_7 & a_8 & a_9 \end{pmatrix} \begin{pmatrix} R \\ G \\ B \end{pmatrix} \quad (11)$$

In the above-described Expression (11) above, R, G and B are signal values before correction, and $R^c$, $G^c$, and $B^c$ are signal values after correction. As for the calculation method for the correction matrix used in Expression (11), the method according to the above-described first embodiment can be used.

In addition, when primary color filters are employed in the imaging device shown in FIG. 8, instead of a single-chip CCD having color difference line-sequential complementary color filters, by correcting signal values of pixels belonging to each group using a correction matrix that is specific to that group, the brightness noise and color noise can be eliminated, as in the case in which color difference line-sequential complementary color filters are used.

What is claimed is:

1. An image processing device comprising:
   a judgment unit that judges to which group a pixel of a color image belongs in accordance with a position of the pixel, the group being a group among a plurality of separate groups determined in accordance with an arrangement of color filters adjacent to a color filter of the pixel, and the color image being an image generated based on output signals from an image acquisition element having the color filters in predetermined arrays;
   a storage unit in which the plurality of separate groups are individually stored in association with correction matrices; and
   a correction unit that (i) obtains, from the storage unit, a correction matrix corresponding to the group to which the pixel belongs, and (ii) corrects types of image signals targeted for correction by using the obtained correction matrix and all types of image signals in the pixel;
   wherein, when individual pixels of color images obtained by capturing images of a plurality of color charts having different spectral characteristics are divided into the groups, the correction matrices comprise correction matrices that define relationships between at least one type of image signal value in a first group and all types of image signal values in a second group.

2. The image processing device according to claim 1, wherein the correction matrices comprise correction matrices that make at least one type of image signal value, from among multiple types of image signal values, with respect to each color chart substantially match between at least two groups.

3. The image processing device according to claim 1, wherein the correction matrices comprise correction matrices that make average spectral characteristics of pixels belonging to a first group substantially match average spectral characteristics of pixels belonging to a second group.

4. The image processing device according to claim 1, wherein a plurality of the groups are determined such that pixels having a common spectral characteristics in the color image generated based on the output signals from the image acquisition element belong to a same group.

5. An image signal correction method of an image processing device, the method comprising:
   judging to which group a pixel of a color image belongs in accordance with a position of the pixel, the group being a group among a plurality of separate groups determined in accordance with an arrangement of color filters adjacent to a color filter of the pixel, and the color image being an image generated based on output signals from an image acquisition element having the color filters in predetermined arrays;
   obtaining a correction matrix corresponding to the group to which the pixel belongs from a storage unit of the image processing device in which the plurality of separate groups are individually stored in association with correction matrices corresponding thereto; and
   correcting types of image signals targeted for correction by using the obtained correction matrix and all types of image signals in the pixel;
   wherein the judging, obtaining, and correcting are performed by the image processing device; and
   wherein, when individual pixels of color images obtained by capturing images of a plurality of color charts having different spectral characteristics are divided into the groups, the correction matrices comprise correction matrices that define relationships between at least one type of image signal value in a first group and all types of image signal values in a second group.

6. The method according to claim 5, further comprising:
   obtaining, in advance, spectral characteristics of the color image generated based on the output signals from the image acquisition element for each of the pixels; and
   determining a plurality of the groups such that pixels having common spectral characteristics belong to a same group.

7. A correction matrix calculation method used in an image processing device when correcting a color image generated based on output signals from an image acquisition element of the device having color filters in predetermined arrays, the correction matrix calculation method comprising:
   obtaining color images by capturing images of a plurality of color charts having different spectral characteristics by using the image acquisition element;
   calculating correction matrices, when individual pixels of the color images are divided into a plurality of separate groups which are determined in accordance with an arrangement of the color filters adjacent to color filters of the individual pixels, such that at least one type of image signal value, from among multiple types of image signal values, with respect to each color chart substantially match between at least two groups; and storing, in a storage unit, the plurality of separate groups such that the plurality of separate groups are individually stored in association with the correction matrices;

wherein the obtaining, the calculating, and the storing are performed by the image processing device.

8. An imaging device comprising:

an image acquisition element having color filters in predetermined arrays;

a judgment unit that judges to which group, from among a plurality of separate groups determined in accordance with an arrangement of the color filters which are adjacent to a color filter of a pixel of a color image generated based on output signals from the image acquisition element, the pixel belongs, the judgment being made in accordance with a position of the pixel;

a storage unit in which the plurality of separate groups are individually stored in association with correction matrices; and a correction unit that (i) obtains, from the storage unit, a correction matrix corresponding to the group to which the pixel belongs, and (ii) corrects types of image signals targeted for correction by using the obtained correction matrix and all types of image signals in the pixel;

wherein, when individual pixels of color images obtained by capturing images of a plurality of color charts having different spectral characteristics are divided into the groups, the correction matrices comprise correction matrices that define relationships between at least one type of image signal value in a first group and all types of image signal values in a second group.

* * * * *